S. E. WHITE.
SHOCK ABSORBER FOR AUTOMOBILES.
APPLICATION FILED MAY 31, 1919.
1,332,478.
Patented Mar. 2, 1920.
2 SHEETS—SHEET 1.
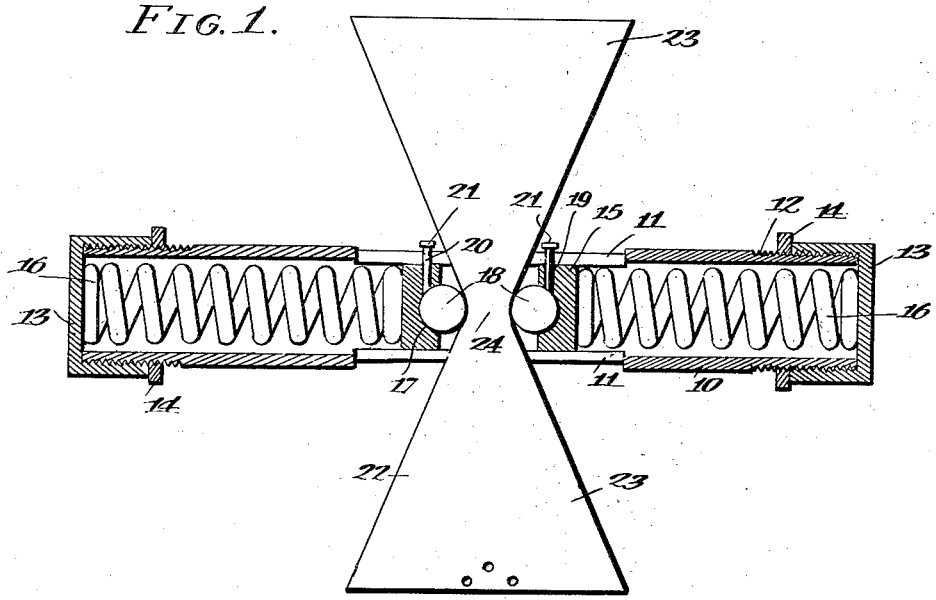
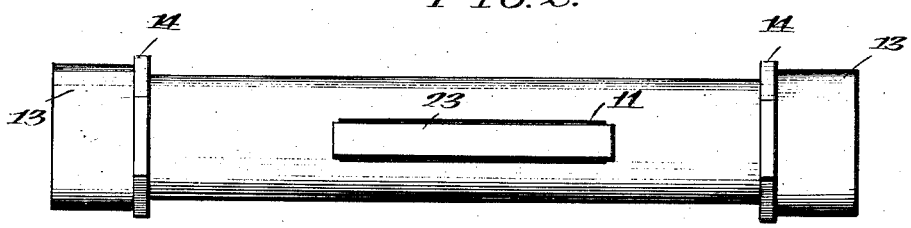
WITNESS
INVENTOR
S. E. WHITE,
BY
ATTORNEYS

S. E. WHITE.
SHOCK ABSORBER FOR AUTOMOBILES.
APPLICATION FILED MAY 31, 1919.

1,332,478. Patented Mar. 2, 1920.
2 SHEETS—SHEET 2.

WITNESS
J. D. Mankin.

INVENTOR
S. E. WHITE,
BY
ATTORNEYS

UNITED STATES PATENT OFFICE.

SANFORD EARL WHITE, OF MARION, OHIO.

SHOCK-ABSORBER FOR AUTOMOBILES.

1,332,478.  Specification of Letters Patent.  Patented Mar. 2, 1920.

Application filed May 31, 1919. Serial No. 300,894.

*To all whom it may concern:*

Be it known that I, SANFORD E. WHITE, a citizen of the United States, residing at Marion, in the county of Marion and State of Ohio, have invented new and useful Improvements in Shock-Absorbers for Automobiles, of which the following is a specification.

My invention relates to shock absorbers for automobiles or other vehicles.

An important object of the invention is to provide a device of the above mentioned character, which is adapted to take up both primary and secondary shocks, in a highly reliable manner.

A further object of the invention is to provide a device of the above mentioned character, having adjustable means to regulate the tension of the yielding elements thereof, whereby the device is adapted for use upon automobiles of different sizes or weights.

A further object of the invention is to provide a device of the above mentioned character, which is adapted to be installed upon automobiles of various types, without materially altering the construction thereof.

Other objects and advantages of the invention will be apparent during the course of the following description.

Figure 3:
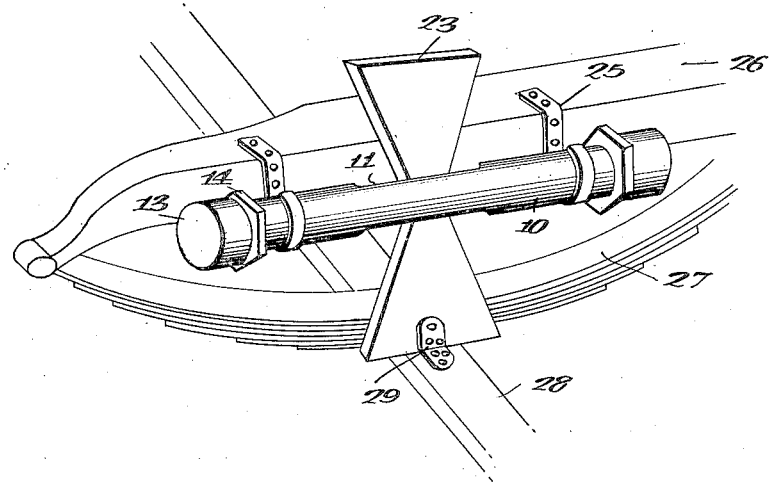
Figure 4:
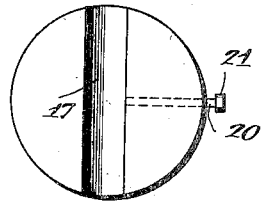
Figure 6:
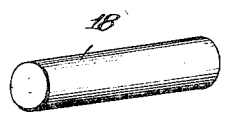
Figure 5:

In the accompanying drawings forming a part of this specification, and in which like numerals are employed to designate like parts throughout the same, Figure 1 is a central vertical longitudinal sectional view through a device embodying my invention, Fig. 2 is a plan view of the same, Fig. 3 is a perspective view of the device in use, Fig. 4 is a side elevation of an element or bearing included in the device, Fig. 5 is an edge elevation of the same, and, Fig. 6 is a perspective view of a roller or anti-friction element.

In the drawings, wherein for the purpose of illustration is shown a preferred embodiment of my invention, the numeral 10 designates a cylindrical tubular body portion or casing, provided in its top or bottom with longitudinal openings or slots 11, equi-distantly, spaced from the ends of the casing 10. The ends of the tubular casing 10 are screw threaded, as shown at 12, to engage within internally screw threaded caps 13. These caps are held against accidental rotation by lock nuts 14 engaging the screw threaded portions 12, as shown.

Arranged to reciprocate within the tubular casing 10 are plunger-bearings 15, the outer sides of which engage with suitably stiff compressible coil springs 16, having their outer ends in contact with the caps 13. It is thus seen that the tension of the springs 16 may be regulated by turning the caps 13. The plunger-bearings 15 are provided upon their inner faces with semi-cylindrical recesses 17, receiving roller elements 18, which are cylindrical. The plunger-bearings 15 are provided with upstanding or vertical openings 19, receiving the tubular portions 20 of oil cups 21. The tubular portions 20 operate through the upper slot 11 and project outwardly above the tubular casing 10, and serve to prevent turning movement of the plunger-bearings 15 in the tubular casing 10. The oil cups 21 serve to supply oil or other lubricant to the roller elements 18, for maintaining them lubricated.

The numeral 22 designates a transverse plate or member including tapered portions 23, decreasing in width inwardly, for providing a contracted portion 24, serving to connect the tapered portions. The tapered portions 23 have angularly arranged faces, converging inwardly toward the intermediate portion 24, and engaging the rollers 18. The transverse member 22 extends through the slots 11 and operates between the rollers 18.

As more clearly shown in Fig. 3, the tubular casing 10 is horizontally arranged in use, and is secured within brackets 25, attached to the longitudinal beam 26 of the frame of the automobile. This beam 26 is supported at its forward end by a leaf spring 27, attached to the forward axle 28 of the automobile. The transverse member 22 is vertical, in use, and its lower end is secured to the axle 28 by a strap 29 or the like. I have found that my shock absorbing device may be used upon automobiles of different types, in which case any suitable means may be employed to connect the tubular casing 10 and the transverse member 22 to the frame and axle or relatively movable parts of the automobile. It is to be distinctly understood that the invention is in no sense restricted to the manner of application of the device to an automobile, as shown in Fig. 3, as such application is intended simply as an example of attaching the device to the automobile.

The operation of the shock absorber is as follows:

When the transverse member 22 is moved vertically upwardly or downwardly with relation to the tubular casing 10, which is caused by the axle 8 being moved vertically with relation to the beam 26, or vice versa, the tapered portions 23 act upon the rollers 18, causing them to move the plunger-bearings 15 outwardly in opposition to the springs 16. These springs thereby absorb or take up the primary or secondary shocks.

It is to be understood that the form of my invention herewith shown and described is to be taken as a preferred example of the same, and that various changes in the shape, size, and arrangement of parts, may be resorted to without departing from the spirit of my invention or the scope of the subjoined claims.

Having thus described my invention, I claim:

1. In a shock absorber of the character described, a tubular casing having its ends screw threaded and provided upon its opposite sides with longitudinal slots, caps having screw threaded engagement with the screw threaded ends of the tubular casing, plunger-bearings slidably mounted within the tubular casing and provided upon their inner faces with recesses and having upstanding openings extending into the recesses, oil cups having tubular portions projecting into the openings and operating within the upper slot to prevent turning movement of the plunger-bearings, rollers arranged within the recesses of the plunger-bearings, compressible coil springs arranged within the tubular casing and disposed between the plunger-bearings and caps, a transverse member operating within the longitudinal slots of the tubular casing and having tapered portions decreasing in width inwardly and engaging the rollers, and means to connect the tubular casing and the transverse member with the movable parts of an automobile.

2. In a shock absorber of the character described, a tubular casing provided upon its opposite sides with longitudinal slots, plunger-bearings mounted to slide within the tubular casing and provided upon their inner faces with recesses and having openings leading into the recesses, oil cups having tubular portions arranged within said openings and extending through one longitudinal slot, yielding means arranged within the tubular casing to oppose the outward movement of the plunger-bearings, and a transverse member extending through the longitudinal slots and including tapered portions engaging the rollers and decreasing in width inwardly.

3. In a shock absorber of the character described, a tubular casing having longitudinal openings, plunger-bearings slidable within the tubular casing and provided upon their inner faces with recesses, rotatable elements within the recesses, means secured to the plunger bearings and projecting through certain of said longitudinal openings to supply a lubricant to the rotatable elements and also serving to prevent rotation of the plunger bearings, yielding means to oppose the outward movement of the plunger-bearings, and a transverse member arranged within the longitudinal openings, said transverse member having tapered portions decreasing in width inwardly and engaging the rotatable elements.

SANFORD EARL WHITE.